United States Patent [19]  
Scharf

[11] 3,969,230  
[45] July 13, 1976

[54] BROMINATED CARBAMOYL DERIVATIVES USEFUL TO IMPART FLAME RETARDING PROPERTY TO COMBUSTIBLE SUBSTRATES

[75] Inventor: Daniel J. Scharf, East Amherst, N.Y.

[73] Assignee: Hooker Chemicals & Plastics Corporation, Niagara Falls, N.Y.

[22] Filed: Dec. 30, 1974

[21] Appl. No.: 537,528

[52] U.S. Cl. .............................. 252/8.1; 106/15 FP; 260/DIG. 24; 428/921; 260/468 E; 260/482 C
[51] Int. Cl.$^2$ .................... B27K 3/00; C07C 69/00; C07C 101/00
[58] Field of Search .................. 252/8.1; 260/482 C, 260/468 E, 471, DIG. 24; 106/15 FD; 428/921

[56] References Cited
UNITED STATES PATENTS

| | | | |
|---|---|---|---|
| 3,700,625 | 10/1972 | Brady et al. | 252/8.1 |
| 3,775,155 | 11/1973 | Eggenweiler | 428/921 |
| 3,829,207 | 11/1974 | Weil | 252/8.1 |
| 3,830,886 | 8/1974 | Davis et al. | 428/921 |
| 3,839,207 | 10/1974 | Weil | 428/921 |
| 3,850,878 | 11/1974 | Murtha et al. | 260/471 C |

*Primary Examiner*—Leland A. Sebastian  
*Assistant Examiner*—Josephine Lloyd  
*Attorney, Agent, or Firm*—Peter F. Casella

[57] ABSTRACT

Described are brominated carbamoyl derivatives of the structure:

$(X^1)(X^2)C - CH_2 - (R^2)_n - O - C(O)N(R)(R^1)$ wherein:
R and $R^1$ independently selected from the group consisting of hydrogen, alkyl, alkanol, cycloalkyl of from 5 to 7 carbon atoms, phenyl, alkyl substituted by phenyl, phenyl substituted by alkyl, hydroxy terminated oxyalkylene, hydroxy substituted hydroxy terminated oxyalkylene and halogen substituted hydroxy terminated oxyalkylene;

$R^2$ is independently selected from the group consisting of alkylene, oxyalkylene, hydroxy substituted oxyalkylene, halogen substituted oxyalkylene and alkylene or oxyalkylene substituted by the group $-O-C(O)N(R)(R^1)$;

X, $X^1$ and $X^2$ are independently selected from the group consisting of halogen and halogen substituted alkyl, wherein the halogen is chlorine or bromine; said alkyl, alkanol and alkylene each independently has from 1 to 4 carbon atoms; said oxyalkylene having from 2 to 4 carbon atoms; $n$ is 0 to 20; preferably 0 to 6;

provided one of X, $X^1$ or $X^2$ is a bromo or a bromo substituted alkyl; and that each carbamoyl group has a replaceable hydrogen in the R or $R^1$ group.

These compounds are useful to impart flame retardant property to combustible substrates.

14 Claims, No Drawings

3,969,230

BROMINATED CARBAMOYL DERIVATIVES USEFUL TO IMPART FLAME RETARDING PROPERTY TO COMBUSTIBLE SUBSTRATES

BACKGROUND OF THE INVENTON

Various materials have been suggested for imparting flame retardant character to combustible materials. U.S. Pat. No. 3,456,041 employs a brominated phosphorous containing material. U. S. Pat. No. 3,642,944 relates to saturated polyester materials which are comprised of reaction products of chlorinated aromatic acids, and dibromoneopentyl glycol. Polyesters containing halogenated phenyl derivatives are described in U.S. Pat. No. 3,772,342. U.S. Pat. No. 3,324,205 teaches flame resistant compositions that are phosphorous containing, as does U.S. Pat. No. 3,830,886. Esters of carbamic acid are taught in U.S. Pat. No. 2,816,910, U.S. Pat. No. 3,391,181 and Belgium Pat. No. 614,347 dated Aug. 23, 1962, reported in Chemical Abstracts 58;3322F.

SUMMARY OF INVENTION

The invention is concerned with imparting a flame retarding property to combustible substrates by employing brominated carbamoyl derivatives having the structure:

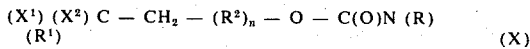

$$(X^1)(X^2)C - CH_2 - (R^2)_n - O - C(O)N(R)(R^1) \quad (X)$$

wherein:
R and $R^1$ are independently selected from the group consisting of hydrogen, alkyl, alkanol, cycloalkyl of from 5 to 7 carbon atoms, phenyl, alkyl substituted by phenyl, phenyl substituted by alkyl, hydroxy terminated oxyalkylene, hydroxy substituted hydroxy terminated oxyalkylene and halogen substituted hydroxy terminated oxyalkylene;
$R^2$ is independently selected from the group consisting of alkylene; oxyalkylene, hydroxy substituted oxyalkylene, halogen substituted oxyalkylene and alkylene or oxyalkylene substituted by the group — O — C(O)N(R) ($R^1$);
X, $X^1$ and $X^2$ are independently selected from the group consisting of halogen and halogen substituted alkyl, wherein the halogen is chlorine or bromine; said alkyl, alkanol and alkylene each independently has from 1 to 4 carbon atoms; said oxyalkylene having from 2 to 4 carbon atoms; n is 0 to 20; preferably 0 to 6;
provided one of X, $X^1$ or $X^2$ is a bromo or a bromo substituted alkyl; and that each carbamoyl group has a replaceable hydrogen in the R or $R^1$ group.

By a "replaceable" hydrogen is meant a hydrogen atom present in the R or $R^1$ group which may become detached therefrom such as during the curing operation of the substrates treated with said compounds.

The compounds of the present invention are used to impart a flame retardant property to combustible materials such as synthetic resins, wood, paper, cellulose containing fibers and fabrics, and the like. In particular, the compounds of the present invention impart flame retardant property to cellulosic containing fabrics by providing reactive sites with the fabric.

DESCRIPTION OF PREFERRED EMBODIMENTS

Method of preparation.

In general, to prepare the compounds of the present invention, one may react an alcohol (1 mole) with phosgene (2 mole) in the liquid phase. The second step is the formation of the carbamoyl group by reacting the product of the first step with ammonia. The hydrogen of the carbamate group may then be replaced or substituted by the appropriate R or $R^1$ groups. See the preparative examples for more details. For example, the initial alcohol could be a halogenated alcohol may be reacted with an epihalohydrin, such as epichlorohydrin or epibromohydrin. Alternatively, the alcohol may be reacted with various alkylene oxides, such as ethylene oxide, propylene oxide or butylene oxide to give the desired oxyalkylene product which can then be reacted with phosgene.

Regardless of how the compounds are prepared, — N — alkanol derivatives are the most preferred compounds. They are prepared by reacting the carbamate with aqueous formalin at a pH of 8 to 9 and a temperature of about 45° centigrade.

As can be seen from the aforementioned preparative reactions, the final product obtained is the result of the starting alcoholic materials that are employed.

Alcohols can be described by the structure (X) ($X^1$) ($X^2$) C — $CH_2$ — ($R^2$)$_n$ — OH. Listed below are preferred alcohols that may be employed in the preparation of the compounds of the present invention.

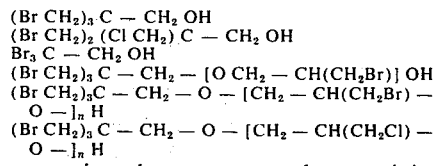

$(Br\ CH_2)_3 C - CH_2 OH$
$(Br\ CH_2)_2 (Cl\ CH_2) C - CH_2 OH$
$Br_3 C - CH_2 OH$
$(Br\ CH_2)_3 C - CH_2 - [O\ CH_2 - CH(CH_2Br)]\ OH$
$(Br\ CH_2)_3 C - CH_2 - O - [CH_2 - CH(CH_2Br) - O -]_n H$
$(Br\ CH_2)_3 C - CH_2 - O - [CH_2 - CH(CH_2Cl) - O -]_n H$

In preparing those compounds containing the $R^2$ substitutent of alkylene or oxyalkylene substituted by the group — O — C(O)N(R) ($R^1$), one reacts phosgene with an alcoholic precursor having not only a terminal hydroxyl group but also hydroxyl group(s) pendant from the appropriate alkylene or oxyalkylene precursor. One may then react the product with ammonia and then have that product undergo a reaction to obtain the appropriate R or $R^1$ derivatives. This therefore results in pendant groups of the structure — O — C(O)N(R) ($R^1$).

USE OF THE COMPOSITIONS

As mentioned above, the compounds of the present invention are useful for imparting a flame retardant property to combustible material. By "combustible material" is meant a material which of its own nature have a tendency to burn when flamed. Flame retardancies can be determined for textile materials in accordance with test AATCC base 34–1952, American Association of Textile Chemists and Colorists. A particularly stringent government standard for flamability is Department of Commerce Standard FF-3-71. The compounds of the present invention are particularly useful in imparting a flame retardant property or characteristic to cellulose materials. The cellulose materials which can be treated to impart flame retardant properties thereto in accordance with this invention include cotton, rayon, paper, jute, ramie, wood and mixtures thereof, as well as blends of cellulosics, such as cotton or rayon with synthetic blends, such as nylon, polyesters, acrylics and with proteinaceous fibers, such as wool and the like. The compounds of the present invention are particularly effective when applied to the cellulosic containing fabrics such as cotton and rayon, as well as blends of said cellulosic materials such as polyester cotton, wherein the amount of the polyester preferably is at least 25% of the fabric, and may be as high as 50 or 75%.

The normal treatment of the cellulosic fabric comprises:

Padding a fabric with a solution of the aforementioned novel compositions, drying such fabric, and curing the thus treated fabric. Frequently, before the flame retardant material is applied to the fabric, earlier pretreatments are applied such as desizing the fabric, scouring or washing the fabric in a commercially available detergent, bleaching the fabric, and washing the fabric again. Then the compounds of the present invention are applied in a solution. In some instances, it is also desirable that the fabric be dried prior to the application of the solution of the compounds of the present invention.

Although the brominated materials may be applied alone i.e., without other flame retarding compositions, a preferred sequence of applying the flame retardant composition of the present invention is to employ additional flame retardant compositions, such as, phosphorous containing materials in combination with the brominated compounds. This may be provided by applying in one bath a combination of the brominated materials together with the phosphorous containing material. Alternatively, the brominated materials may be applied sequentially, that is, the fabric is treated with the brominated materials and subsequently treated with the phosphorous containing materials. Alternatively, a sequential process can be followed wherein the phosphorous containing materials are applied to the desired fabric and then the brominated materials are applied. The most preferred process is where the brominated materials are applied in one bath with desirable phosphorous containing materials. See the aforementioned references for a listing of various phosphorous containing materials that may be employed in conjunction with the brominated compounds. See also U.S. Pat. No. 3,421,923 for teachings as to various techniques for applying desirable phosphorous containing materials, which description is incorporated by reference.

It is to be appreciated that the amount of the phosphorous flame retardant material that may be employed can vary substantially. In essence the amount employed should be such that it is effective to impart a flame retardant property to the combustible substrate or material. In general preferred phosphorous flame retardants are Pyrovatex [trademark of Ciba-Geigy for $(CH_3O)_2 — P(O) — C_2H_4 — C(O) NHCH_2OH$], tetrakis (alpha-hydroxyorgano) phosphonium salts, such as the inorganic salts as the halides or sulfates, and the like, or salts of organic materials such as the acids as acetic, formic, oxalic and the like, or the product of neutralization of the tetrakis phosphonium compound with alkalic metal hydroxide or a tertiary amine.

The tetrakis (alpha-hydroxyorgano) phosphonium compounds of the subject composition may be further defined as a compound having the formula:

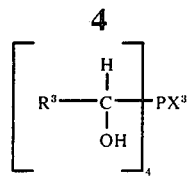

wherein $R^3$ is selected from the group consisting of hydrogen, lower alkyls having between about 1 and about 6 carbon atoms, halogenated lower alkyls having between about 1 and about 6 carbon atoms, lower alkenyls having between about 1 and about 6 carbon atoms, halogenated lower alkenyls having between about 1 and about 6 carbon atoms, aryls having between about 6 and about 10 carbon atoms, halogenated aryls having between about 6 and about 10 carbon atoms, cycloalkyls having between about 3 and about 6 carbon atoms, halogenated cycloalkyls having between about 3 and about 6 carbon atoms, and $X^3$ is a halogen, such as chlorine, bromine, fluorine or iodine. Typical examples of suitable tetrakis (alpha-hydroxyorgano) phosphonium halide compounds are tetrakis (hydroxymethyl) phosphonium chloride, tetrakis (hydroxymethyl) phosphonium bromide, tetrakis (alpha-hydroxyethyl) phosphonium chloride, tetrakis (alpha-hydroxypropyl) phosphonium chloride, tetrakis (alpha-hydroxyallyl) phosphonium chloride, tetrakis (alpha-hydroxybenzyl) phosphonium chloride, tetrakis (alpha-hydroxymethylcyclohexyl) phosphonium chloride, tetrakis (alpha-hydroxypropenyl) phosphonium chloride, tetrakis (alpha-hydroxybutenyl) phosphonium chloride and mixtures thereof. The phosphonium compounds may be used in monomer form or in a partially polymerized for, so long as they are still water soluble. For example, tetrakis (hydroxymethyl) phosphonium chloride, which is the preferred phosphonium compound, may be heated to effect partial polymerization before dissolving it in the solution.

The tetrakis (alpha-hydroxyorgano) phosphonium hydroxide useful in the present invention may have the formula $$[R^3 — CH(OH)]_4 P — OH$$

wherein $R^3$ has the above described meaning. The preferred material is tetrakis (hydroxymethyl) phosphonium hydroxide.

When applying the brominated compounds to a substrate such as fabric which is to be rendered flame retardant, a solution of the brominated compounds is employed. The most preferred solution is an aqueous solution. However, other solvents may be employed providing the compounds are soluble therein, such as alkanols of from 1 to 4 carbon atoms, aromatic solvents, such as benzene, toluene, xylene and the like, and chlorinated solvents such as chlorinated hydrocarbons of from 1 to 4 carbon atoms, and the like. Therefore the phosphonium salts should be soluble therein.

The compounds of the present invention when applied to the fabric, should be applied such that there is a wet pick-up of from 10 to 200%. When the compounds of the present invention are used in conjunction with flame retardant phosphorous compositions in one bath, the ratio of the compounds, on a weight basis, should be from 1 to 10; 10 – 1, of brominated carbamoyl; phosphorous containing compositions.

The most preferred flame retardant composition of the present invention contains the N-methylol derivatives used in conjunction with tetrakis (hydroxymethyl) phosphonium chloride or hydroxide, most preferably the chloride.

When a solution of tetrakis (hydroxymethyl) phosphonium hydroxide is used to impregnate the cellulosic containing fabric, it is to be appreciated that it is in equilibrium with tris (hydroxymethyl) phosphine. Such a solution is well known in this art and can be prepared by reacting an aqueous solution of tetrakis (hydroxymethyl) phosphonium chloride with an approximately equimolar quantity of an organic or inorganic base, preferably sodium hydroxide. The pH of the final solution is adjusted to from 7 to 9 and preferably to from 7.5 to 8.1. For the purpose of this invention, the active component of the aqueous solution is considered to be tetrakis (hydroxymethyl) phosphonium hydroxide. Hereinafter, the active component will be expressed in terms of this component, although it is probable that there is present a mixture of tris (hydroxymethyl) phosphine and tetrakis (hydroxymethyl) phosphonium hydroxide.

The aqueous treating solution may be applied to the cellulosic material in any convenient manner. For example, the solution may be applied by padding, dipping, spraying, and the like. After impregnation, the excess solution is preferably removed from the material by passing the material through squeeze rolls, centrifuging, wringing, or other methods. Although a wet pick-up of from about 10 to about 200% may suitably be used preferably the material contains final resin add-on of about 1 to 50%, preferably about 5 to about 35% by weight.

Of the above enumerated carbamoyl derivatives that may be employed in the imparting of a flame retardant property to the cellulosic materials, the most preferred compounds are those that contain the group - $CH_2Br$ for the X, $X^1$ and $X^2$ substituent. While the X, $X^1$ and $X^2$ substitutents may be varied, it is preferred that the compositions impart durable flame retardance to the cellulosic material. Therefore those materials that contain substitutents which may undergo dehydrohalogenation are less preferred due to their possible long term instability.

Further details of the invention are given below wherein all percentages are by weight and all temperature degrees centigrade unless otherwise indicated.

EXAMPLE 1

Preparation of Carbamoyl Tribromoneopentane

Into a 500ml 3-neck round-bottom flask equipped with a gas inlet tube and an exhaust tube connected to a caustic trap was added a solution of 108 gr. (0.3 mole) tribromoneopentyl alcohol in 250ml tetrahydrofuran (THF). To this solution was added 35 gr. (0.35 mole) of phosgene meted from a cylinder. The reaction flask was cooled in an ice-water bath followed by the slow addition of triethyl amine whereupon a precipitate of triethyl amine .HCL was observed. After stirring at 5°C for 2 hours, a large excess of ammonia gas was bubbled into the reaction flask (slight exotherm noted). After standing at room temperature overnight, the reaction mixture was filtered and the filtrate stripped in vacuo (55°C, 20mm) to an oil which solidified on standing. Crude yield — 120 gr. (99% of theory).

H'NMR ($CDCl_3$ + tetramethyl silane) was consistent with the desired product and indicated ca. 80% purity.

Recrystallization of a small quantity of crude from $ETOH/H_2O$ gave a white crystalline solid, m.p. 109° – 111°C, lit. 110° – 110.5°C.

| Combustion Anal. Calcd. for $C_6H_{10}Br_3NO_2$ | Found |
|---|---|
| 19.60% C | 20.14% C |
| 2.72% H | 2.84% H |
| 3.81% N | 3.67% N |
| 65.20% Br | 64.81% Br |

EXAMPLE 2

Preparation of N,N - Bishydroxymethyl Carbamoyl-tribromoneopentane

Method

Into a 250ml flask was placed 100 ml of 37% aqueous formalin. pH was adjusted to 8 – 9 with 10% aqueous NaOH and 20 gr. of carbamoyltribromoneopentane was added over 45 min. as a pulverized powder. After the first 5 gr. was added, the reaction solution was heated to and maintained at 45°C throughout the addition and for an additional hour. Periodic readjustment of pH was required. The water was stripped in vacuo on a rotary evaporator to constant weight. NMR analysis (DMSO - $d_6$) was consistant with the desired product.

EXAMPLE 3

Application of N,N - Bishydroxymethyl Carbamoyltribromoneopentane to 100% Cotton and 50/50 Polyester/Cotton N,N - Bishydroxymethyl carbamoyltribromoneopentane prepared according to Example 2 was diluted with methanol to a 40% solution. Monsanto catalyst AC* (5%) (trademark for 2-amino - 2-methylpropanol .HCl) was added and the solution padded onto separate fabrics of 100% cotton and 50/50 polyester/cotton. The treated fabric samples were dried at 200°F/1.5 min., cured at 320°F/2.5 min. and scoured. After line drying, the 100% cotton had 26.9% resin add-on and the 50/50 polyester/cotton 20.3% resin add-on. Flame retardancy was indicated by oxygen index measurements.

Oxygen Index

100% Cotton* — O.I. 24
50/50 PE/Cotton** — O.I. 23
* O.I. of untreated 100% Cotton - 20.1
** O.I. of untreated 50/50 PE/Cotton - 17.6

EXAMPLE 4

1 Step Application of THPOH/N,N — Bishydroxymethyl Carbamoyltribromoneopentane to 100% Cotton and 50/50 Polyester/Cotton A 50% THPOH (aqueous solution was formulated with an equal volume of a 30% (20 gr. $CH_3OH$, 15 gr. $H_2O$) solution of N,N - bishydroxymethyl carbamoyltribromoneopentane prepared according to Example 2. The resultant solution (40% solids) was padded onto separate fabric samples of 100% cotton and 50/50 polyester/cotton. Each sample was dried at 200°F/2 min., cured at 300°F/2 min., cured in an ammonia atmosphere for 2 min. and scoured. The 100% cotton had 8.2% resin add-on and the 50/50 polyester/cotton had 11.3% resin add-on. Flame retardancy was indicated by oxygen index measurement.

Oxygen Index

100% Cotton* — O.I. 25
50/50 PE/Cotton** — O.I. 25
* O.I. of untreated 100% Cotton — 20.1
** O.I. of untreated 50/50 PE/Cotton — 17.6

I claim:

1. A method of imparting a flame retarding property to a combustible material comprising treating the combustible material with an effective flame retarding imparting amount of a composition of the structure $$(X^1)(X^2)C - CH_2 - (R^2)_n - O - C(O)N(R)(R^1) \quad (X)$$

wherein:
R and $R^1$ independently selected from the group consisting of hydrogen, alkyl, alkanol, cycloalkyl of from 5 to 7 carbon atoms, phenyl, alkyl substituted by phenyl, phenyl substituted by alkyl, hydroxy terminated oxyalkylene, hydroxy substituted hydroxy terminated oxyalkylene and halogen substituted hydroxy terminated oxyalkylene;
$R^2$ is independently selected from the group consisting of alkylene, oxyalkylene, hydroxy substituted oxyalkylene, halogen substituted oxyalkylene and alkylene or oxyalkylene substituted by the group — $O - C(O)N(R)(R^1)$;
X, $X^1$ and $X^2$ are independently selected from the group consisting of halogen and halogen substituted alkyl, wherein the halogen is chlorine or bromine; said alkyl, alkanol and alkylene each independently has from 1 to 4 carbon atoms; said oxyalkylene having from 2 to 4 carbon atoms; $n$ is 0 to 20;
provided one of X, $X^1$ or $X^2$ is a bromo or a bromo substituted alkyl; and that each carbamoyl group has a replaceable hydrogen in the R or $R^1$ group.

2. The method of claim 1 wherein $n$ is 0.
3. The method of claim 1 wherein X is bromoalkyl.
4. The method of claim 3 therein $X^1$ and $X^2$ are bromoalkyl.
5. The method of claim 1 wherein R is alkanol.
6. The method of claim 5 therein $R^1$ is alkanol.

7. The method of claim 1 wherein the brominated material is of the structure $(BrCH_2)_3 C - CH_2 - O - C(O)NRCH_2OH$.

8. The method of claim 1 wherein the percent by weight of resin add-on ranges from about 1% to about 50%.

9. The method of claim 1 further comprising an effective flame retarding imparting amount of a phosphorous composition.

10. The method of claim 1 wherein the combustible substrate is a cellulosic containing fabric.

11. The product of the method of claim 1.

12. The product of the method of claim 9.

13. A composition useful for imparting a flame retarding property to a combustible material comprising an effective flame retarding imparting amount of a composition of the structue $$(X^1)(X^2)C - CH_2 - (R^2)_n - O - C(O)N(R)(R^1) \quad (X)$$

wherein:
R and $R^1$ independently selected from the group consisting of hydrogen, alkyl, alkanol, cycloalkyl of from 5 to 7 carbon atoms, phenyl, alkyl substituted by phenyl, phenyl substituted by alkyl, hydroxy terminated oxyalkylene, hydroxy substituted hydroxy terminated oxyalkylene and halogen substituted hydroxy terminated oxyalkylene;
$R^2$ is independently selected from the group consisting of alkylene, oxyalkylene, hydroxy substituted oxyalkylene, halogen substituted oxyalkylene and alkylene or oxyalkylene substituted by the group — $O - C(O)N(R)(R^1)$;
X, $X^1$ and $X^2$ are independently selected from the group consisting of halogen and halogen substituted alkyl, wherein the halogen is chlorine or bromine; said alkyl, alkanol and alkylene each independently has from 1 to 4 carbon atoms; oxyalkylene having from 2 to 4 carbon atoms; $n$ is 0 to 20; provided one of X, $X^1$ or $X^2$ is a bromo or a bromo substituted alkyl; and that each carbamoyl group has a replaceable hydrogen in the R or $R^1$ group.

14. The composition of claim 13 further comprising an effective flame retarding imparting amount of a phosphorous composition.

* * * * *

UNITED STATES PATENT OFFICE
CERTIFICATE OF CORRECTION

PATENT NO. : 3,969,230
DATED : July 13, 1976
INVENTOR(S) : Daniel J. Scharf

It is certified that error appears in the above-identified patent and that said Letters Patent are hereby corrected as shown below:

Abstract, line 3, "$(X^1) (X^2) C - CH_2 - (R^2)_n - O - C(O)N(R) (R^1)$" should read --$(X) (X^1) (X^2) C - CH_2 - (R^2)_n - O - C(O)N(R) (R^1)$--.

Column 7, line 15, "$(X^1) (X^2) C - CH_2 - (R^2)_n - O - C(O)N(R)(R^1)$", should read --$(X) (X^1) (X^2) C - CH_2 - (R^2)_n - O - C(O)N(R) (R^1)$--. (X)

Column 8, line 18, "composition of the structue" should read --composition of the structure--.

Signed and Sealed this

Twenty-sixth Day of October 1976

[SEAL]

Attest:

RUTH C. MASON
Attesting Officer

C. MARSHALL DANN
Commissioner of Patents and Trademarks